UNITED STATES PATENT OFFICE.

BENJAMIN BATES, OF BALTIMORE, MARYLAND.

IMPROVEMENT IN ROOT OR TONIC BEER.

Specification forming part of Letters Patent No. 113,617, dated April 11, 1871; reissue No. 4,755, dated February 13, 1872.

DIVISION A.

*To all whom it may concern:*

Be it known that I, Dr. BENJAMIN BATES, of the city of Baltimore, in the State of Maryland, have invented a new and useful Root or Tonic Beer, of which the following is a specification:

My invention relates to the manufacture of root or tonic beer as a beverage; and the said invention consists in the use of ground or pulverized hops, sassafras, ginger, and southern prickly ash, in proper proportions, in the making of a tonic-beer beverage. My invention also consists in the use of glycerine, in part or in whole, as a substitute for sugar in the manufacture of beer, for the purpose of obtaining a more perfect preservation of the beverage, and allow it to be kept for a longer time without spoiling.

In the manufacture of tonic beer hitherto, the several ingredients of hops, sassafras, ginger, and southern prickly ash have been used in their crude state, by subjecting them to a cooking or steeping process in water. This method, I have found from experience, not only deteriorates from the medicinal and flavoring properties of these articles, but, to a very great extent, these qualities are lost in such preparation, because, in the cooling process of the crude articles thus cooked, there is more or less fermentation, which necessarily produces a vinous condition of the mass, thereby destroying the natural flavor of the articles, and rendering them highly objectionable for use.

The advantages gained in reducing these articles to a ground or pulverized condition previous to their use are that I am enabled to use them together, when so ground, at once, without cooking and in cold water; in which condition a much larger per cent. of their full strength and substance are extracted, and their natural flavor fully preserved at a great saving of time and labor.

The advantages of treating root or tonic beer with glycerine instead of sugar, or in combination with sugar, are that the beverage is preserved for a longer time from fermentation and deterioration in flavor; whereas, in the use of sugar alone for sweetening purposes, as heretofore, it is apt to separate and precipitate, and very materially changes the flavor of the beer.

The glycerine, moreover, more readily incorporates itself with the beer than does sugar, and not only prevents or removes the cause of fermentation or decay, but also produces a more clear and limpid condition of the beer, and consequently renders it a better and more merchantable beverage.

A very great advantage in using these raw articles in a ground or pulverized condition is that a smaller quantity may be used to produce a given quantity of the beverage, and thus more than compensate for the labor of reducing the articles to this condition. It is, moreover, well understood that hops, bark, and roots, when reduced to powder, will more readily give out their essence, when subjected to the action of water, than when in their solid or leafy condition; and, in this respect, my process is productive of the very best results. By the use of pulverized hops, roots, or barks in the manufacture of tonic or root beer, I am not only enabled to produce, at much less cost of time and labor, a more desirable article in quality and flavor, but the neutralizing effects of the glycerine also renders the beverage not likely to ferment or sour during the process of manufacturing, and it will keep without deterioration for a long time after being bottled.

I compound my improved beverage in the following manner: I take two ounces of pulverized hops, ten ounces of pulverized sassafras, twelve ounces of pulverized ginger, two ounces of pulverized southern prickly ash, and a small quantity of glycerine, to which I add a suitable quantity of sugar, extract of wintergreen, and a small amount of burned sugar, the latter to give color. These ingredients I put into a sufficient quantity of cold or warm water, and then compound my beer at once in the well-known manner of compounding root beer.

The proper proportions for a given quantity of the beverage herein described are well understood by those having experience in the manufacture of such beverages.

Having described my invention, I claim—

1. The use of the ingredients herein described, in a pulverized state, in the manufacture of root or tonic beer, made wholly or in part of the articles herein mentioned, as described.

2. The use of glycerine in the manufacture of beer, to produce the effects herein described.

3. The combination, with glycerine, of the ingredients herein described in the manufacture of root or tonic beer.

4. As a new article of manufacture and trade, the tonic or root beer herein described.

BENJAMIN BATES.

Witnesses:
OSCAR D. BATES,
C. H. SLICER.